Nov. 21, 1961 R. KAISER 3,009,680
SHUT-OFF COCK WITH SPHERICAL PLUG
Filed Feb. 10, 1960
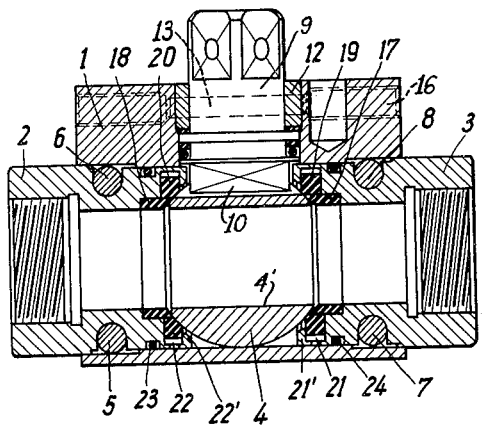
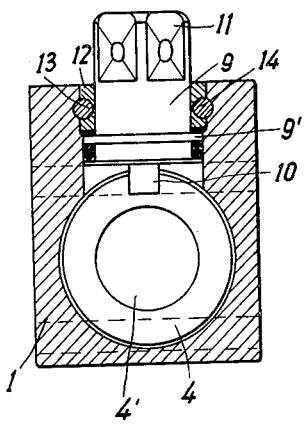
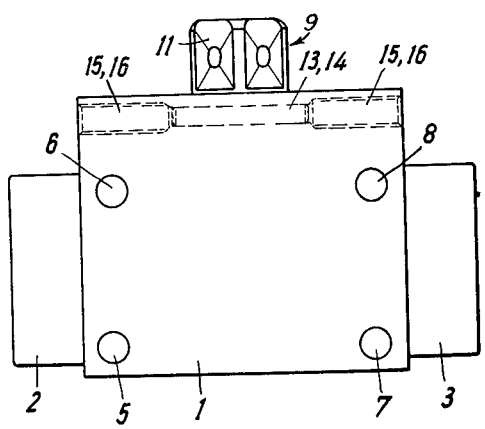
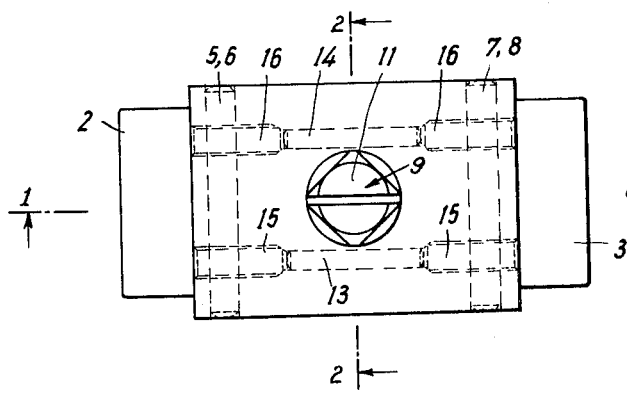
Inventor:
Rudolf Kaiser
By Ernest A. Marmorek,
His Attorney.

United States Patent Office 3,009,680
Patented Nov. 21, 1961

3,009,680
SHUT-OFF COCK WITH SPHERICAL PLUG
Rudolf Kaiser, Rohrerweg 18, Ettlingen,
Baden, Germany
Filed Feb. 10, 1960, Ser. No. 7,797
Claims priority, application Germany Feb. 19, 1959
2 Claims. (Cl. 251—315)

This invention relates to a shut-off cock of the kind having a spherical plug held between metal bearing surfaces which are arranged in the housing and which form parts of a spherical surface and which are sealed by packing rings which are arranged co-axially with the throughflow passage and are drawn with pretensioning onto a cylindrical seating, which packing rings comprise a rectangular cross-section with a bevelled inner edge serving to bear against the spherical plug, and project beyond the metal bearing surfaces for the spherical plug when the latter is not mounted.

The seating surfaces for the packing rings are formed of bushings which are inserted in the wall of the throughflow apertures in the housing or an insert sleeve and whose mutually facing end faces centre the spherical plug.

An object of the invention is to provide an improved shut-off cock of the above kind so as to simplify manufacture and assembly. The packing rings bearing on the surface of the spherical plug are also to be so fixed in the cock housing that they cannot be carried along by the medium flowing through the cock.

According to the invention, for supporting purposes there are arranged at the ends of the insert sleeves facing towards the plug, annular chambers which are open towards the throughflow passage and are intended to receive the packing rings and whose radial diameter is greater than the packing ring diameter and whose walls facing towards the spherical plug do not extend as the surface of the latter but are only of such radial length that the packing rings are secured against being pulled out of their positions. The annular chambers for receiving the packing rings are so dimensioned in the radial sense that when the packing rings swell there is sufficient space in which they can expand.

The invention is illustrated by way of example in the accompanying drawings in which:

FIGURE 1 is a longitudinal sectional view through a spherical-plug cock according to the invention, taken on the line 1—1 of FIG. 4 both through the axis of the housing and through the axis of rotation of the spherical plug;

FIGURE 2 shows a section at right angles to FIGURE 1, taken on the line 2—2 of FIG. 4 through the cock housing and through the control spindle axis, the control spindle itself and the spherical plug not however being shown in section;

FIGURE 3 is a view from the same direction as FIGURE 1 but in elevation instead of in section, and FIGURE 4 is a plan view of the cock housing in the direction of the control spindle.

The pipe sockets or insert sleeves 2 and 3 are fixed in the block-like housing 1 of the shut-off cock by means of the fixing pins 5, 6, 7 and 8. The axes of these pins are at right angles to the axis of throughflow through the cock and to the bore 4' in its spherical plug 4. The mutually facing end faces of centering bushings 17 and 18 which are inserted in known manner in the wall of the pipe sockets 2 and 3, bear on the surface of the spherical plug 4 at both sides thereof. The packing rings 19 and 20 are drawn with pre-tensioning on to the outer periphery of these centering bushings; this is accomplished by first placing the packing rings 19 and 20 into their annular chambers 21 and 22, respectively, and then there are inserted by axially directed pressure the centering bushings 17 and 18 into their places inside the packing rings; since the inner diameter of each packing ring 19, 20 is smaller than the external diameter of the respective centering bushing 17, 18, the packing ring will by this pressure insertion of the centering bushing be widened and will fit with a pre-tension on the centering bushing. The packing rings are of rectangular cross-section with a bevelled inner edge serving for bearing against the spherical plug 4. They are guided at both their end faces in said annular chambers 21 and 22 which are arranged coaxially to the throughflow bore 4' of the plug 4. The radial diameter of the said annular chambers is larger than the diameter of the packing rings 19 and 20. This is important in order that the latter can have space to expand when they swell. Those walls 21' and 22' of the annular chambers 21 and 22 which face towards the spherical plug 4 do not extend as far as the surface of the plug 4. They are only of such radial length as reliably to prevent the packing rings 19 and 20 from being carried away by the medium flowing through the cock.

The pipe sockets 2 and 3 of the shut-off cock are sealed relatively to the axial longitudinal bore of the cock housing 1 by O-rings 23 and 24 which in the illustrated embodiment are mounted in annular grooves in the pipe sockets 2 and 3. Naturally, it would also be possible to provide a seal in some other way.

The control spindle 9 of the spherical-plug cock comprises at its end mounted in the housing 1 an annular flange 9' and a tongue 10 which is preferably of rectangular cross-section (see FIGURE 2). This tongue engages in a correspondingly shaped recess in the spherical plug 4. In this way, the control spindle 9 is operatively connected to the spherical plug 4. Above the annular flange 9', the control spindle 9 is guided in a holding sleeve 12 preventing the spindle 9 from being pulled upwards out of the housing 1. The holding sleeve 12 is held in the said housing by means of the two pins 13 and 14, as will be clearly seen from FIGURES 2, 3 and 4. The pins 13 and 14 are held in the illustrated positions at both sides by grub screws 15 and 16. The operating handle (not shown) of the shut-off cock is set on the square end 11 of the control spindle which projects from the housing.

It will be seen that the packing rings 19 and 20 are so fixed in their position shown in FIGURE 1 that they cannot be carried away by the medium flowing through the cock.

I claim:
1. A shut-off cock comprising a housing defining inlet and outlet portions of a flow passage, a spherical plug in said housing, and having a flow passage portion therethrough cooperating with the flow passage portions in the housing, said portions forming a flow passage coaxial with the axis of said housing and plug therein, cylindrical bearing bushings arranged in said housing and forming parts of spherical bearing surfaces for said plug, and pretensioned packing rings seated on said bushings coaxially with said axis, and having a rectangular cross-section with a bevelled inner edge serving to bear against the spherical plug and projecting beyond the bushings when the spheri- cal plug is removed, said packing rings being received in annular chambers defined in said housing and disposed at right angle to said axis and being open towards the flow passage and of greater radial diameter, radially of said axis, than the packing rings, and the walls of the said chambers facing the spherical plug extending radially only part way towards said plug but sufficiently far to restrain removal of the packing rings from their seatings.

2. A shut-off cock as claimed in claim 1, said housing including insert sleeves surrounding said inlet and outlet portions of the flow passage, the chambers receiving the packing rings being formed in said insert sleeves in the housing.

References Cited in the file of this patent

UNITED STATES PATENTS

| 2,839,266 | Kaiser | June 17, 1958 |
| 2,861,773 | Clade | Nov. 25, 1958 |

FOREIGN PATENTS

| 78,228 | Sweden | June 17, 1932 |
| 919,449 | France | Mar. 7, 1947 |